Aug. 9, 1955  A. J. WILLIAMS, JR., ET AL  2,715,209
ZERO-POINT ADJUSTING CIRCUIT
Filed March 10, 1951  3 Sheets-Sheet 1

INVENTORS.
ALBERT J. WILLIAMS, JR.
WILLIAM RUSSELL CLARK
BY
Woodcock and Phelan
ATTORNEYS INVENTORS.
ALBERT J. WILLIAMS, JR
WILLIAM RUSSELL CLARK
BY Woodcock and Phelan
ATTORNEYS INVENTORS.
ALBERT J. WILLIAMS, JR.
WILLIAM RUSSELL CLARK
BY
*Woodcock and Phelan*
ATTORNEYS

United States Patent Office 2,715,209
Patented Aug. 9, 1955

2,715,209

ZERO-POINT ADJUSTING CIRCUIT

Albert J. Williams, Jr., Philadelphia, and William Russell Clark, Jenkintown, Pa., assignors to Leeds and Northrup Company, Philadelphia, Pa., a corporation of Pennsylvania Application March 10, 1951, Serial No. 214,892

10 Claims. (Cl. 324—99)

This invention relates to measuring systems utilizing feedback amplifiers in measurement of voltages or currents corresponding with the magnitude or changes in magnitude of temperature, ion concentration and other physical, chemical or electrical quantities, and particularly relates to arrangements for adjusting the zero of indicating or recording equipment responsive to changes in output of the amplifier.

In systems of this type, the unknown voltage to be measured is applied to the input circuit of a high-gain amplifier whose output is fed back to its input circuit in opposition to the voltage under measurement. A meter or recorder responsive to the feedback current or voltage can be calibrated in terms of the quantity corresponding with the unknown input voltage. Such systems are capable of measuring very small potentials and currents but are subject to zero shift introduced, for example, by contact potentials in the input circuit and by stray potentials or currents due to extraneous fields. Prior arrangements for compensating for the shift in zero have the disadvantage that they required additional supply sources and interconnections themselves impairing operation of the system because inherently providing paths or couplings for spurious signals masking or obliterating the voltage under measurement.

In accordance with the present invention, a zero-adjusting voltage variable in polarity and magnitude is derived from a source having an electrical ground in common with the supply source for the amplifier: specifically and in preferred modifications, the zero-compensating voltage is derived from a potentiometer network which is supplied from the same supply source which provides anode-current for the amplifier and which has a polarity transition point connected to the ground terminal of that supply source.

Further in accordance with the invention, the recorder, indicator or equivalent exhibiting instrument is either connected directly to the aforesaid common ground or is connected thereto by a balancing circuit impedance of such low magnitude that in either case there is inappreciable disturbance by ground currents of components of the equipment or by stray capacitive pick up from extraneous fields.

The invention further resides in features of combination and arrangement hereinafter described and claimed.

For a more detailed understanding of the invention and for illustration of various embodiments thereof, reference is made to the accompanying drawings, in which:

Fig. 1, an explanatory figure, is a circuit diagram illustrative of a feedback amplifier type of measuring system without zero-shift compensation;

Figure 1:
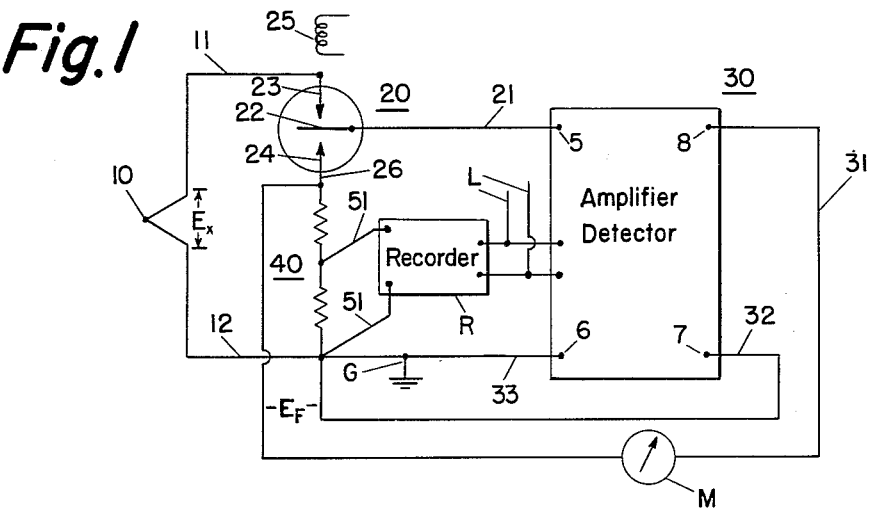

Referring to Fig. 1, the thermocouple 10 is exemplary of a source of voltage or current whose magnitude varies as a function of temperature to which the thermocouple is exposed. Other sources such as photoelectric cells, pH cells and the like suited for response to other physical, chemical or electrical conditions are generically represented by source 10. When the output of source 10 is a direct current or voltage, it is preferably converted, as by vibratory converter 20, such as shown in copending application Serial No. 725,465, now U. S. Letters Patent 2,614,188, into an alternating voltage for amplification by a high-gain amplifier 30 whose direct-current output is applied in opposition to the output of source 10 in the input circuit of the amplifier.

More specifically, when the source 10 is a direct-voltage or direct-current source, vibrator 20 is driven by actuator 25 to compare the input voltage, $E_x$, applied through conductor 11 to contact 23, with a feedback voltage, $E_F$, from amplifier 30 applied through conductor 31 to contact 24. Amplifier-detector 30 responds to the difference between the feedback voltage and the input voltage to vary the feedback voltage in direction and magnitude to reduce such difference substantially to zero. The output of amplifier-detector 30 as appearing across its output terminals 7, 8 is applied by conductors 31—32 of the feedback circuit to the resistance 40, which resistance or resistor is also connected between one terminal of thermocouple 10, as by conductor 12, and fixed contact 24 of vibrator 20. Movable or common contact 22 of vibrator 20 alternately connects to the input source 10 through fixed or separate contact 23 and conductor 11 and then to the feedback circuit through fixed or separate contact 24. When the feedback voltage is substantially equal to the input voltage, contact 22 alternately engages points or contacts of equal potential and no voltage difference will be applied to input terminals 5, 6 of amplifier-detector 30. When a potential difference develops between fixed contacts 23 and 24, such as by an increase in the E. M. F. of thermocouple 10, movable contact 22 will apply to the input terminals 5, 6 an alternating signal voltage representative of this potential difference. Amplifier-detector 30 amplifies this alternating current and reconverts it to direct current, of polarity and magnitude corresponding with the phase and magnitude of the signal voltage, which is applied through conductors 31 and 32 to resistance 40, so to vary the feedback potential across resistance 40 very closely to balance the potential applied by conductor 11 to fixed contact 23. The amplifier-detector because of its high gain maintains this balance at a very low differential input level, i. e., of the order of 4 microvolts. Meter M may be inserted in the amplifier output circuit, and its indication of the feed back current flowing through resistance 40 is a measure of the unknown voltage $E_x$. Alternatively or in addition, a potentiometer recorder R can be connected across a suitable fraction of resistance 40 to record in the particular arrangement shown the varying temperature to which thermocouple 10 responds. Recorder R may be the electronic type such as shown in Patent No. 2,113,164, or it may be of the galvanometer type shown in Patent No. 1,935,732.

In the particular system shown in Fig. 1, the operating voltages and currents for the tubes of amplifier 30 are supplied from a power supply not shown, but energized from an alternating-current power line L, L.

In use of measuring systems of the type exemplified by Fig. 1, it is found that the operating point or "zero" of the system shifts: such shift may be due to various causes including change of the amplifier characteristics and variation of contact potentials of the input circuit including voltage source 10 and conductors 11 and 12 to introduce stray or spurious voltages. For example, it has been found that in installations measuring the voltage output from the hot junction of a thermocouple, an unwanted or error voltage arises when the cold junction of the thermocouple is not maintained at the reference temperature. In still another example, when the voltage of pH cells is to be measured, it has been found that electrodes vary, developing a voltage other than the voltage representative of the pH of the solution. This voltage is a fairly constant error voltage for a given cell and is known as the "asymmetric voltage." This shift of the zero point of the measuring system can be compensated for by provision in the ampler input circuit of an additional voltage source which is adjustable to oppose and neutralize error voltages causing the drift. With a thermocouple input to the system, both hot and cold junctions are immersed in a liquid held at the reference temperature, such as ice water for zero degrees centigrade, and the additional voltage is adjusted to set the output indication at the reference temperature. With a pH cell as input to the system, a buffer solution which hydrolyzes to a known pH is used with the cell, and the additional voltage is adjusted for the correct pH reading.

The problem is to insert such a compensating voltage of adjustable polarity and magnitude without possibility of introducing, as in previously proposed arrangements, even greater errors due to the introduction of stray currents to ground through mutual impedances in the circuit.

Figure 2:
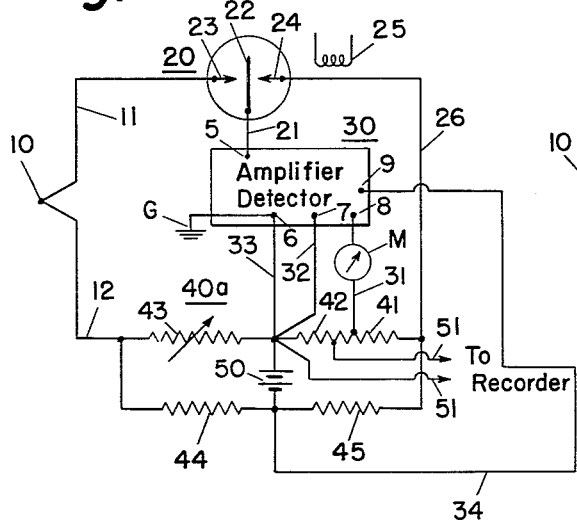
Figs. 2 and 4 are circuit diagrams illustrating modifications of Fig. 1 which include manually adjustable networks for zero-correction or setting of the measuring system.

In Fig. 2 is shown one solution of that problem. A resistance network 40a and a third source of voltage 50 are in circuit with the unknown voltage source 10, amplifier-detector 30, and vibrator 20. The feedback from amplifier-detector 30 is applied by way of conductors 31 and 32 to resistance 42 which functions in the circuit of Fig. 2 in the same manner as resistance 40 of Fig. 1. Voltage source 50 is shunted by two resistance paths, the first path consisting of fixed resistor 44 and variable resistor 43 of network 40a, and the second path consisting of fixed resistors 45, 41 and 42. The input circuit of amplifier-detector 30 alternately includes two paths, the first path being traced from fixed contact 23 of vibrator 20 to conductor 11, voltage source 10, conductor 12, variable resistor 43 and conductor 33; and the second path being traced from fixed contact 24 of vibrator 20 to conductor 26, fixed resistor 41, fixed resistor 42 and conductor 33. The resistances of network 40a are so proportioned that by adjustment of variable resistor 43, equal and opposite voltages from voltage source 50 can be developed in each of the two aforesaid input paths of amplifier 30, or differing voltages of either greater or smaller values can be developed across resistor 43 relative to the voltage across resistors 41 and 42.

In this manner, variations in the potentials of the input circuit can be compensated by adjustment of resistor 43 to effect a zero reading of the recorder or a correct reading with a known input other than zero input. It is to be noted that voltage source 50, the feedback conductor 32 and amplifier-input conductor 33 have a common tie point or connection G which can be the ground point for the system, thereby avoiding mutual couplings which would introduce spurious signals and stray voltages which disturb measurements of the voltage source 10 and tend to reduce the ultimate sensitivity and stability of the measuring system. Exposed portions of each circuit have stray capacitive coupling to proximate sources of alternating voltage such as to power transformers and alternating current leads. The equivalent circuit effect is that of a high impedance generator applying a stray voltage to such exposed portions. If, as here provided, the return paths have low impedance, negligible stray voltages will be introduced into the measuring circuit. It has been found that common return paths having resistance of about one ohm develop less than half of a microvolt of stray or disturbing input, which can be tolerated. When the "ground" connection between units is kept of low impedance, they will function electrically as a unitary shield.

As described in connection with Fig. 1, a meter M may be included in conductor 31 or 32 of the feedback circuit to measure the feedback current as an indication of the magnitude of the unknown voltage or current from source 10. More usually, a recorder R is connected by conductors 51 to utilize a fraction of the voltage across resistance 42 and is calibrated in terms of the variable condition under measurement. It is to be noted that one terminal of the recorder is connected to the common tie point G of the amplifier input circuit and source 50, which circuit minimizes spurious signals due to leakage or displacement currents from the recorder motor or recorder amplifier flowing through common impedances to ground. As described for other units similarly connected to the common tie point, these spurious signals are such as those induced by stray capacitive coupling to alternating voltage sources, and are prevented from introducing stray voltages or spurious signals by the provision of low impedance connection to a common tie point.

In the circuit of Fig. 2, resistor 43 is adjustable above and below a value for which it has substantially the same ratio to resistance 44 as the sum of resistances 41 and 42 has to resistance 45. When there is no error voltage requiring compensation, resistor 43 is adjusted, with zero signal input, so that the potential across resistance 43 due to current from source 50 is equal to the potential of opposite polarity across resistances 41 and 42, due to current flow from the same source. In this case, the ratio of resistance 43 to resistance 44 is equal to the ratio of the sum of resistances 41 and 42 to resistance 45. If resistance 43 is decreased in ohmic value, a compensating voltage of one polarity will be applied across conductors 12 and 26 and hence across fixed contacts 23 and 24 of vibrator 20; and if resistance 43 is varied to increase in ohmic value, a compensating voltage of opposite polarity will be developed across conductors 12 and 26 and hence across fixed contacts 23 and 24 of vibrator 20. The current requirements of this zero-adjusting circuit are very low and the several resistances are preferably of high ohmic values. Specifically, the resistance path consisting of fixed resistor 45, fixed resistance 41 and fixed resistance 42 is of very high ohmic value, with resistors 45 and 41 having much greater resistance than resistor 42. In this manner, the fraction of the voltage from source 50 which appears across resistance 42 is of low magnitude. This is important because measurements of the voltage across a fraction of resistance 42, when utilized as an indication of the input voltage from source 10 and applied to a recorder by way of conductors 51—51, will measure not only the feedback voltage applied through conductors 31 and 32 but will include some fraction of the voltage from source 50, the fraction being determined by the voltage division between resistor 42 and resistors 41 and 45 in series across source 50. With resistors 41 and 45 of very high ohmic value and resistor 42 of a comparatively low ohmic value, this voltage will be negligible in comparison to the feedback voltage from the amplifier-detector 30. In a particular case, resistors 41 and 45 were of the order of 1 and 100 megohms respectively, and resistor 42 was of the order of 1,000 ohms. From examination of the voltage division characteristics of such a resistance circuit, it will be seen that the voltage across resistance 42 due to current from source 50 will be a small fraction of one per cent of the voltage from source 50 as applied to the total resistance path consisting of resistors 45 and 41 and 42. Since this voltage is low and constant, correction for it is readily accomplished.

With variable resistor 43 adjusted to compensate for error voltages so to place the zero or operating point of the system at zero or at some desired offset position, actuation of vibrator 20 by actuator 25 will cause movable contact 22 alternately to apply the unknown voltage from source 10 and the voltage from the feedback circuit, as developed across resistor 42, to the amplifier-detector 30. If the potentials on contacts 23 and 24 are equal, there is no signal applied to the input terminals of the amplifier-detector 30 and the system remains in equilibrium. If a small increase or decrease in the voltage from source 10 develops, the potential on fixed contact 23 will change accordingly, and contact 22, in its alternate contacting of contact 23 and contact 24, will develop an alternating current signal upon conductor 21 to amplifier-detector 30. This signal is greatly amplified, reconverted to direct current and applied across resistance 42 to develop a voltage on fixed contact 24 substantially equal and opposite to the voltage applied to contact 23 from source 10. The amplification factor of amplifier-detector 30 is large, so that a very minute potential difference between contacts 23 and 24 is sufficient to maintain a feedback voltage across resistance 42 for continuous balance of the system. The feedback current through conductors 31 and 32 and resistance 42 can be measured by meter M calibrated in terms of the variable condition, such as temperature, under measurement. A fraction of the voltage across resistance 42 can be applied to a recorder by way of conductors 51, 51 for continuously recording the variations of temperature, or other measured condition.

Figure 3:
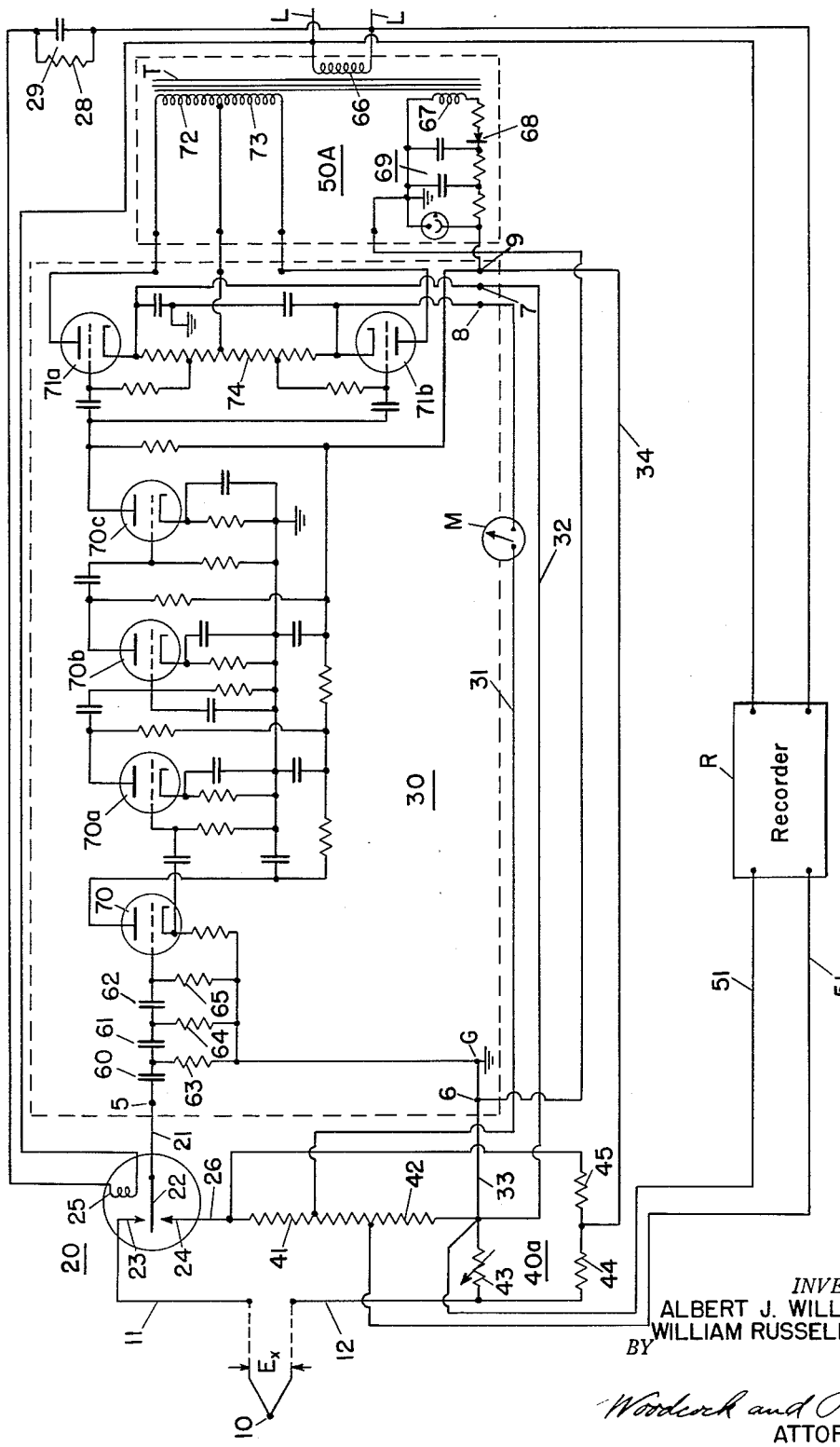
Fig. 3 is a detailed circuit diagram of the modification shown in Fig. 2.

Fig. 3 shows the circuit of Fig. 2, except that the amplifier-detector 30 and power supply 50A are shown in detailed schematic circuit. Where the same components are shown, the same identifying numerals are used.

The signals applied to movable contact 22 charge capacitor 60 up to signal voltage. If the voltage on fixed contact 23 is different from the voltage on fixed contact 24, the charge on capacitor 60 will fluctuate at the vibratory rate of contact 22 and will apply the resulting alternating signal to an amplifier stage 70. The network including capacitors 61, 62 and resistors 63, 64, 65 may be employed to prevent the modulation of grid current by the vibrator 20. Such an arrangement is described in U. S. Patent 2,622,192 to R. E. Tarpley. Additional amplifier stages 70a, 70b, etc., are used to provide the gain necessary for operation of detector tubes 71a and 71b. Detector tubes 71a and 71b provide a feedback circuit across terminals 7 and 8, to which resistor 42 is connected by leads 31 and 32 to provide a voltage on contact 24 substantially equal to the voltage on contact 23. Power supply 50A provides regulated direct current between terminals 6 and 9, for operation of the amplifier stages and for energizing the zero-compensating resistance network 40a.

The actuator 25 is energized from supply lines L—L by way of a phasing network comprised of resistor 28 and capacitor 29. Power from lines L—L energizes primary 66 of transformer T, inducing suitable voltages in secondaries 67, 72 and 73. Rectifier 68 and filter-regulator network 69 connect to secondary 67 to provide direct current between terminals 9 and 6. The anodes of tubes 71a and 71b are supplied with oppositely-phased alternating current from secondary 72 and 73, while their grids are driven in parallel by the last amplifier stage 70c. If the synchronously moving contact 22 causes a positive voltage pulse to be applied to these grids, the tube which simultaneously has a positive half cycle applied to its anode will conduct while the other tube remains near cut-off. Thus, the phase relation between pulses of grid voltage and the alternating plate voltage determines the direction of current flow in resistor 74 and the polarity of the voltage on terminals 7 and 8. This voltage is applied to resistor 42 to present the feedback voltage maintaining contact 24 substantially at the same voltage as contact 23.

Figure 4:
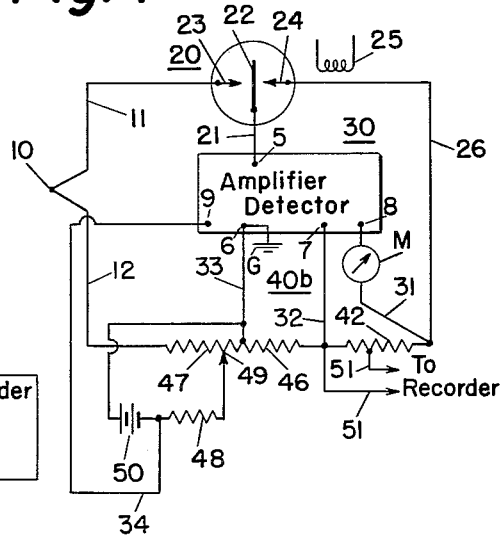

When a theoretically exact measurement without any correction is desired, and a small difference in ground connection of the feedback circuit from the ground connection of the amplifier 30 input and the compensating voltage source 50 can be tolerated, the zero-adjustment arrangement shown in Fig. 4 may be used.

Voltage source 10 is connected to contact 23 of vibrator 20 by conductor 11 and to resistance network 40b by conductor 12. The feedback voltage is developed across resistor 42 and applied to contact 24 of vibrator 20 by conductor 26. Voltage source 50 is connected to the low side of the input to amplifier 30 by conductor 33 and through resistor 48 to variable contact 49 which is movable along resistors 46 and 47 connected in series between voltage source 10 and the feedback voltage circuit across resistor 42. Conductor 33 connects to the junction of resistors 46 and 47, which may be a tap of a potentiometer having resistance sections 46, 47.

With contact 49 positioned along resistor section 47, the compensating voltage is in series with the voltage to be measured; with contact 49 positioned to the right of the junction point along resistor section 46, the compensating voltage is of opposite polarity in the circuit and is in series with the feedback voltage across resistor 42. In this manner, by adjustment of contact 49, the compensating voltage can be effective in either polarity across contacts 23 and 24 of vibrator 20 as required to neutralize error voltages or to shift the zero or operating point of the system. Resistor 46 is between the low side connection for the amplifier input and voltage source 50 to conductor 33 and the feedback circuit to conductor 32. However, resistors 46 and 47 are of low ohmic value and provide negligible common impedance to ground. None of the compensating voltage is applied across resistor 42 and, hence, is not applied to the recorder R connected thereto by leads 51.

As described for preceding figures, actuator 25 moves contact 22 synchronously between contacts 23 and 24 to generate an alternating signal representative of any voltage difference between these contacts.

It is to be noted that voltage source 50 is connected to conductor 33, providing a common ground point with the input to amplifier-detector 30. While voltage source 50 is shown as a battery supply, it also can be the source 50A shown in Fig. 3. In either case, the provision of the common tie point minimizes, as above more fully discussed, the possible introduction of spurious signals.

Figure 5:
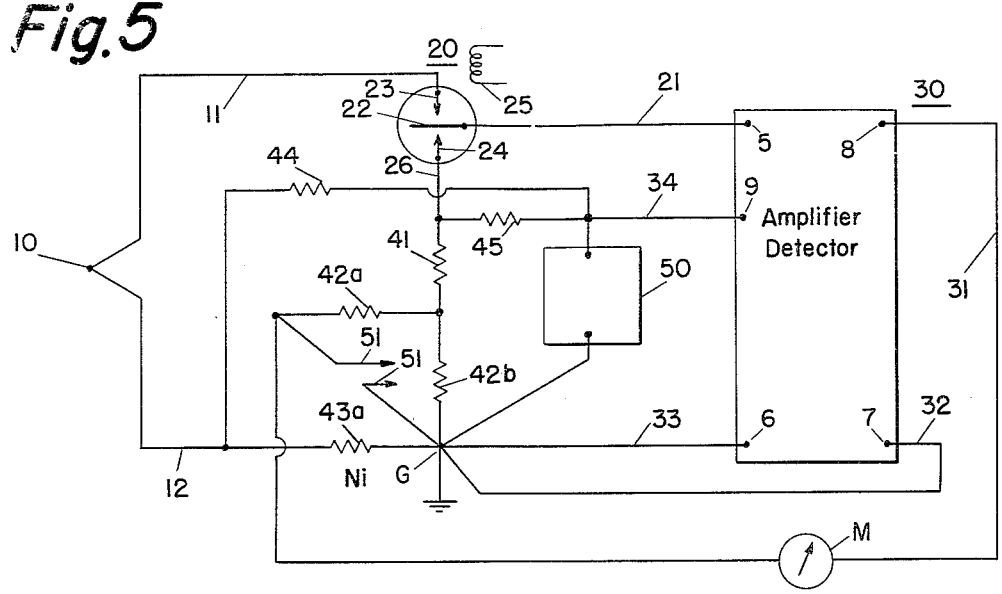
Figs. 5 and 6 are circuit diagrams illustrating modifications of Fig. 1 which include automatically adjustable networks for zero-correction or setting of the measuring system.

In Fig. 5, automatic zero-point or operating-point compensation is provided by a network including resistor 43a having a positive temperature coefficient of resistance. The voltage developed across resistor 43a by current from the source 50 changes with temperature automatically to neutralize changes in the contact potentials of the circuit with temperature and to neutralize changes in the thermocouple E. M. F. due to changes in the temperature of its cold junction. Resistor 43a may be of nickel which exhibits a suitable positive temperature coefficient of resistance. The ohmic value of resistor 43a is about 1⅓ ohms, determined by the relation:

$$\Delta E_T = C_R \times R \times I$$

where $E_T$=thermocouple voltage change per degree centigrade, or about 40 microvolts per degree centigrade,
$C_R$=coefficient of resistance, 0.006 for nickel,
$R$=resistance of resistor 43a in ohms,
$I$=current through 43a in amperes, usually about .005 ampere, so $$40 \times 10^{-6} = 0.006 \times R \times .005$$

and $$R = 1\tfrac{1}{3} \text{ ohms}$$

If desired, the feedback output of amplifier-detector 30 can be a high impedance output, i. e., it can provide higher voltage and lower current. With a high impedance output between conductors 31 and 32, the fraction of the feedback voltage necessary for developing a voltage upon contact 24 equal and opposite to the input voltage upon contact 23 is provided by dividing the feedback voltage between resistors 42a and 42b, with only resistor 42b in series with the input circuit and the vibrator. A recorder connected to conductors 51—51 can then utilize the entire feedback voltage as shown in Fig. 5. As in Fig. 2, it is to be seen that the recorder, the feedback circuit, the voltage source 50, and the input to amplifier-detector 30 have a common ground connection or tie point, thereby avoiding disturbance due to the flow of disturbing currents through common impedances to ground. This absence of undesired coupling between elements of the measuring system permits a wide range of zero-point compensation while avoiding disturbances that reduce the sensitivity or impair the performance of the measuring system.

Figure 6:
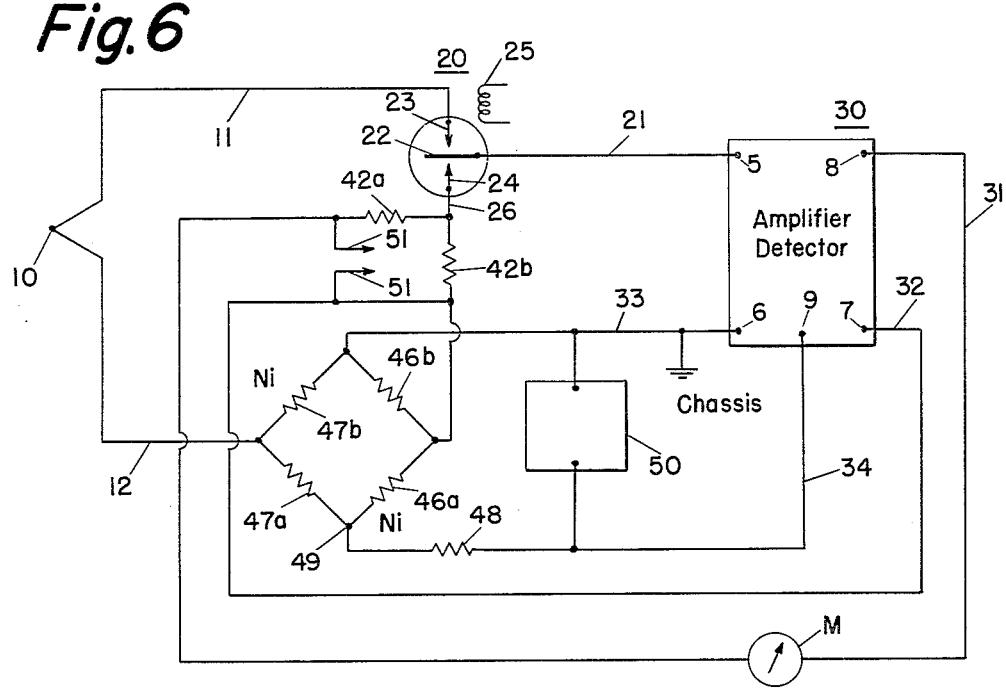

Fig. 6 is similar in circuitry and in operation to the embodiment of Fig. 4, except that in Fig. 6 a bridge network consisting of positive temperature coefficient resistors 46a and 47b and negative temperature coefficient resistors 46b and 47a is utilized in place of resistors 46 and 47 of Fig. 4. Since this bridge network serves automatically to compensate for changes in zero-point or variations in the contact potentials of the input system, tap 49 is a fixed connection between resistors 46a and 47a.

As described for Fig. 4, instead of including feedback resistor 42 within the circuit shunting voltage source 50, a small resistance can be interposed between the feedback circuit and the common tie point, to place the zero-point adjustment circuit outside the circuit connected to a recorder R. This excludes any fraction of the voltage from source 50 from application to recorder R. Thus, in Fig. 6, voltage source 50 and the input to amplifier-detector 30 have a common connection to chassis, while the feedback circuit is removed from this tie point by the resistance network 46a, 46b, 47a and 47b. This resistance network presents a low impedance between these points because, as described for Fig. 5, the positive temperature coefficient resistors have resistances in the order of magnitude of one ohm. Accordingly, resistors 46a, 46b and 47a, 47b are of the same order of magnitude as resistor 43a of Fig. 5. This causes negligible disturbance since the ohmic value of the feedback circuit's path to ground is very low, and the circuits which would tend to disturb the measuring system are connected to a common ground point.

As described for Fig. 5, the feedback circuit can be a high impedance circuit providing a higher voltage than necessary to equalize the input voltage. In such a case, the feedback voltage is divided between resistors 42a and 42b with only resistor 42b in series with the vibrator and the input circuit. With the recorder connected across conductors 31 and 32, it will receive a voltage higher than, but proportional to, the voltage of source 10 and is calibrated accordingly.

It shall be understood the invention is not limited to the specific arrangements shown, and that changes and modifications may be made within the scope of the appended claims.

What is claimed is:

1. In a system for measuring the unknown electrical output of a source, a vibrator having spaced separate contacts and a common contact alternately connecting to each of said separate contacts, an electrical resistance in series circuit with said source of unknown output and said separate contacts of said vibrator, a compensating voltage source having one terminal connected to an intermediate point of said electrical resistance and voltage-dropping means connected between the other terminal of said compensating voltage source and said electrical resistance for developing in said series circuit a first voltage across one portion of said resistance and for developing a second voltage across a second portion of said resistance, a feedback circuit connected across at least part of said resistance to develop a feedback voltage effectively opposing in said series circuit a signal voltage corresponding with said unknown output, means to indicate the magnitude and polarity of said feedback voltage, and an amplifier energizing said feedback circuit and having its input circuit connected between said intermediate point of said resistance and the common contact of said vibrator for response to any difference between the applied signal voltage and the feedback voltage and for operation of said indicating means about a zero point determined by the relative magnitudes of said first and second voltages.

2. In a system for measuring the unknown electrical output of a source, a vibrator having spaced separate contacts and a common contact alternately connecting to each of said separate contacts, an electrical resistance in series circuit with said source of unknown output and said separate contacts of said vibrator, a compensating voltage source having one terminal connected to an intermediate point of said electrical resistance and voltage-dropping means connected between the other terminal of said compensating voltage source and said electrical resistance for developing in said series circuit a first voltage across one portion of said resistance and for developing a second voltage of opposite polarity from said first voltage across a second portion of said resistance, a feedback circuit connected to the junction of said portions of the resistance and across at least part of said resistance to develop a feedback voltage effectively opposing in said series circuits a signal voltage corresponding with said unknown output, means to indicate the magnitude and polarity of said feedback voltage, and an amplifier energizing said feedback circuit and having its input circuit connected between said junction and the common contact of the vibrator for response to any difference between the applied signal voltage and the feedback voltage and for operation of said indicating means about a zero point determined by the relative magnitudes of said first and second voltages.

3. In a system for measuring the unknown electrical output of a source, a vibrator having spaced separate contacts and a common contact alternately connecting to each of said separate contacts, an electrical resistance in series circuit with said source of unknown output and said separate contacts of said vibrator, a compensating voltage source having one terminal connected to an intermediate point of said electrical resistance and voltage-dropping means connected between the other terminal of said compensating voltage source and said electrical resistance for developing in said series circuit a first voltage across one portion of said resistance and for developing a second voltage across a second portion of said resistance, a feedback circuit connected across at least part of said resistance to develop a feedback voltage effectively opposing in said series circuit a signal voltage corresponding with said unknown output, and an amplifier energizing said feedback circuit and having its input circuit connected between the common vibrator contact and said intermediate point of said resistance wherein the resistance is low between said intermediate point of said resistance and the adjacent feedback circuit connection to present insignificant coupling impedance to stray signals.

4. In a measuring system using a feedback type amplifier, a source of voltage to be measured, a vibrator having spaced separate contacts and a common contact alternately engageable therewith, a resistance in series with said separate contacts and the source of voltage to be measured, a source of direct voltage variably connected to first and second parts of said resistance, a feedback circuit of said amplifier connected across a third part of said resistance; and an amplifier input circuit connected to a movable contact of said vibrator and to an intermediate point of said resistance thereby to shunt the second part and the third part of said resistance in one vibrator position and to shunt the source of voltage to be measured and the first part of said resistance in another vibrator position, whereby variation of the connection for said source of direct voltage shifts the zero point of said system so that the feedback circuit provides a voltage across the third part of said resistance substantially equal and opposite to the voltage to be measured.

5. A measuring system comprising circuit connections for application thereto of an unknown voltage, a source of a second voltage, detecting means having its input connected in a common series loop with said voltages for comparing said voltages and responsive to the difference between said voltages, a feedback connection from said detecting means to vary said second voltage to reduce said difference substantially to zero, means to indicate the magnitude and polarity of said second voltage, a source of a third voltage, and variable resistance means connected across said source of a third voltage and having a variable portion in said common series loop with said unknown voltage and with said second voltage to adjust the zero of said indicating means, said third voltage source and said detecting means having a common connection in avoidance of mutual impedance coupling for undesirable currents.

6. A self-balancing measuring system comprising a first source of an unknown voltage and of an error voltage, a feedback voltage, detecting means having its input connected in a common series loop with said voltages for comparing said voltages and responsive to the voltage difference therebetween to vary the feedback voltage to reduce said difference substantially to zero, a second source of voltage connected to said detecting means, and variable resistance means shunting said second source of voltage and having a variable portion in said common series loop with said first source and with said feedback voltage to vary the relationship of the voltages thereof and to compensate for said error voltage, said second source of voltage and said detecting means and said feedback voltage having a common connection to avoid mutual impedance coupling for undesirable currents.

7. A measuring system comprising a source of an unknown voltage, a source of a known voltage, detecting means having its input connected in a common series loop with said voltages for comparing said voltages and responsive to the difference between said voltages, a feedback connection from said detecting means for adjusting said known voltage to reduce said difference substantially to zero, a source of a third voltage connected to said detecting means, and a resistance network having resistance shunting said source of a third voltage and having a portion of said resistance connected in series with said sources of unknown and of known voltages to vary the relationship between said last-named voltages, said third voltage source and said detecting means having a common connection in avoidance of mutual impedance coupling for undesirable currents.

8. A measuring system comprising a source of voltage to be measured, a vibrator having spaced separate contacts and a common contact alternately connecting to each of said separate contacts, a resistance network and the separate contacts of said vibrator connected in series with said source of voltage to be measured, an amplifier having its input circuit connected to the common contact of said vibrator and to an intermediate point of said resistance network and having its output circuit connected across a part of said resistance network to one side of said intermediate point, said amplifier upon actuation of said vibrator being responsive to differences in the voltages on said separate contacts to produce an output voltage substantially equal to the voltage to be measured, means to indicate the magnitude and polarity of said output voltage, and a voltage supply connected to said amplifier to provide the operating voltage for said amplifier and connected through voltage-dropping means to said resistance network for developing a first voltage across one portion of said resistance network and developing a second voltage across another portion of said resistance network to determine the zero point of said indicating means, said portions of said resistance network being on opposite sides of said intermediate point.

9. A measuring system comprising a source of voltage to be measured, a vibrator having spaced separate contacts and a common contact alternately connecting to each of said separate contacts, a resistance network and the separate contacts of said vibrator connected in series with said source of voltage to be measured, an amplifier having its input circuit connected to the common contact of said vibrator and to an intermediate point of said resistance network and having its output circuit connected across a portion of said resistance network, said amplifier upon actuation of said vibrator being responsive to differences in the voltages on said separate contacts to produce an output voltage substantially equal to the voltage to be measured, means to indicate the magnitude and polarity of said output voltage, and a voltage supply connected to said amplifier to provide the operating voltage for said amplifier and connected through voltage-dropping means to said resistance network for developing a voltage in said resistance network to control the relation between said output voltage and said voltage to be measured in determination of the zero point of said indicating means.

10. A measuring instrument for measuring the magnitude of a quantity with respect to a variable zero point comprising means for producing an unknown voltage representative of the magnitude of said quantity, amplifying means producing a known output voltage, circuit means forming a loop including said known voltage and said representative voltage for applying to the input of said amplifying means said representative voltage and said known voltage whereby said amplifying means responds to their difference to produce said known voltage in said loop circuit to reduce said difference substantially to zero, and means for producing a zero determining voltage comprising a voltage source, resistance means connected in series in said loop circuit, said voltage source having one terminal connected to an intermediate point on said resistance means and voltage-dropping means connecting the other terminal of said source to the terminal points of said resistance means, said intermediate point also being connected to an input terminal of said amplifier and to one side of said known voltage.

References Cited in the file of this patent
UNITED STATES PATENTS

| | | |
|---|---|---|
| 2,190,743 | Vance | Feb. 20, 1940 |
| 2,230,779 | Johnson | Feb. 4, 1941 |
| 2,368,351 | Ewen | Jan. 30, 1945 |
| 2,459,730 | Williams | Jan. 18, 1949 |
| 2,490,579 | Clewell | Dec. 6, 1949 |